US008228808B2

(12) United States Patent
Goto et al.

(10) Patent No.: US 8,228,808 B2
(45) Date of Patent: Jul. 24, 2012

(54) INFORMATION COMMUNICATION DEVICE AND METHOD FOR SELECTING PROTOCOL

(75) Inventors: Fumihide Goto, Kanagawa-ken (JP); Kenichi Fujii, Tokyo (JP); Hiroshi Mashimo, Tokyo (JP); Hidetada Nago, Kawasaki (JP); Tatsuhiko Sakai, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1098 days.

(21) Appl. No.: 11/395,126

(22) Filed: Apr. 3, 2006

(65) Prior Publication Data

US 2006/0235987 A1    Oct. 19, 2006

(30) Foreign Application Priority Data

Apr. 8, 2005  (JP) .................. 2005-112655

(51) Int. Cl.
*H04L 12/26* (2006.01)
(52) U.S. Cl. .................. 370/252; 370/255; 709/237
(58) Field of Classification Search .............. 370/464, 370/465, 466, 467; 455/39, 500, 507, 517; 709/224, 230, 232; 710/1, 8, 11, 100, 105
See application file for complete search history.

(56) References Cited

U.S. PATENT DOCUMENTS

| | | | | |
|---|---|---|---|---|
| 5,577,023 | A * | 11/1996 | Marum et al. .................. 370/225 |
| 6,212,160 | B1 * | 4/2001 | Barbieri et al. ............... 370/217 |
| 7,316,022 | B2 | 1/2008 | Nishio | |
| 7,324,462 | B1 * | 1/2008 | Page et al. ...................... 370/255 |
| 2002/0099814 | A1 * | 7/2002 | Mastrianni .................... 709/224 |
| 2002/0156947 | A1 | 10/2002 | Nishio | |
| 2002/0161867 | A1 * | 10/2002 | Cochran et al. ............... 709/221 |
| 2003/0126617 | A1 * | 7/2003 | Tewari et al. ................. 725/119 |
| 2003/0224814 | A1 * | 12/2003 | Qu et al. ........................ 455/517 |
| 2004/0046990 | A1 | 3/2004 | Yano et al. | |
| 2004/0162804 | A1 * | 8/2004 | Strittmatter et al. ............... 707/1 |
| 2005/0198267 | A1 * | 9/2005 | Parks et al. .................... 709/224 |
| 2008/0034127 | A1 | 2/2008 | Nishio | |

FOREIGN PATENT DOCUMENTS

| | | |
|---|---|---|
| JP | 11-113061 | 4/1999 |
| JP | 2003-006133 A | 1/2003 |
| WO | WO 2004/100001 | 11/2004 |

OTHER PUBLICATIONS

Pending U.S. Appl. No. 10/541,383, filed Jul. 1, 2005, Fumihiro Goto, Kazuya Sakamoto, Takao Aichi, Kentaro Yano, Kazuyuki Masumoto, Akitoshi Yamada, Ruriko Mikami.
Pending U.S. Appl. No. 10/773,328, filed Feb. 9, 2004, Masao Kato, Akitoshi Yamada, Fumitaka Goto, Tetsuya Kawanabe.

* cited by examiner

*Primary Examiner* — Nittaya Juntima
*Assistant Examiner* — Khoa Huynh
(74) *Attorney, Agent, or Firm* — Fitzpatrick, Cella, Harper & Scinto

(57) ABSTRACT

An information communication device has a storage medium that stores information to determine a target information communication device on a network. A selection unit selects at least one protocol from plural protocols for obtaining information on other information communication devices on the basis of the stored information. A generating unit generates a list of information communication devices that have the at least one selected protocol as target information communication devices which a user can select on the network.

9 Claims, 7 Drawing Sheets

FIG. 3

| INFORMATION ELEMENT | ELEMENT | DETAILS |
|---|---|---|
| WIRELESS | ESSID | |
| | BSSID | |
| | CIPHER | |
| | AUTHENTICATION | |
| | . . | |
| UNIQUE TO DEVICE | UUID | |
| | . . | |

FIG. 4

| INFORMATION ELEMENT | ELEMENT | DETAILS |
|---|---|---|
| WIRELESS | ESSID | |
| | BSSID | |
| | CIPHER | |
| | AUTHENTICATION | |
| | . . | |
| UNIQUE TO DEVICE | UUID | |
| | . . | |
| DISCOVERY INFORMATION | PROTOCOL | UPnP or Rendezvous |
| USER SELECTION INFORMATION | YES/NO | WHETHER USER HAS SELECTED INFORMATION COMMUNICATION DEVICE |

INFORMATION COMMUNICATION DEVICE AND METHOD FOR SELECTING PROTOCOL

BACKGROUND OF THE INVENTION

1. Field of the Invention

The present invention relates to an information communication device that has a plurality of protocols for obtaining information on connection targets and a method for selecting protocols.

2. Description of the Related Art

The discovery protocol is available as a technique for automatically obtaining information on network devices connected to local area networks (LANs). Network devices can readily connect to other network devices through the use of data obtained by the discovery protocol. The discovery protocol is implemented in various forms, for example, a standard or a de facto standard. For example, Universal Plug and Play (UPnP) proposed by Microsoft Corporation and Rendezvous (or Bonjour) proposed by Apple Computer, Inc. are available. Web Services Dynamic Discovery (WS-Discovery), Service Location Protocol (SLP), and the like other than these protocols are also available, and there is no compatibility among these discovery protocols.

Several techniques (hereinafter, referred to as discovery protocols) for automatically obtaining information on connection targets exist. There is, however, no compatibility among these techniques, as described above. Thus, some devices cannot readily connect to each other. Consequently, there is a disadvantage for users such that the number of types of devices available via networks decreases.

Accordingly, information communication devices need to have at least two discovery protocols. However, when the number of discovery protocols that information communication devices have increases, a disadvantage arises, in that the amount of communication packet data to be processed by information communication devices increases because plural discovery protocols are simultaneously executed.

Moreover, while the number of detected devices increases because information communication devices have a plurality of discovery protocols, devices that are not required by users are searched for. Thus, a disadvantage arises, such that user selectivity and operability are impaired.

SUMMARY OF THE INVENTION

The present invention is provided to improve user convenience in a case where there are a plurality of protocols for obtaining information on connection targets.

Moreover, the present invention is provided to display devices for which information can be obtained from a network in a format that is convenient to a user.

Moreover, the present invention is provided to reduce the load of processes of a plurality of available protocols for obtaining information on connection targets.

The present invention provides a communication device which includes a storage unit that stores information for determining a target communication device on a network, a selecting unit that selects at least one protocol from a plurality of protocols for obtaining information on other communication devices on the basis of the information stored in the storage unit, and a generating unit that generates a list of communication devices that have the at least one protocol selected by the selecting unit as target communication devices that a user can select on the network.

Moreover, the present invention provides a communication device which includes a collecting unit that collects information on other communication devices on a network via the network, a storage unit that stores information for determining a target communication device on the network, and a determining unit that determines a protocol to be stopped from among a plurality of protocols for obtaining the information on the other communication devices on the network on the basis of the information collected by the collecting unit and the information stored in the storage unit.

Moreover, the present invention provides a method for selecting a protocol that is executed by the aforementioned communication devices.

Moreover, the present invention provides a computer-readable code embedded in a recording medium for causing a computer to execute the method for selecting a protocol.

Further features of the present invention will become apparent from the following description of exemplary embodiments with reference to the attached drawings.

BRIEF DESCRIPTION OF THE DRAWINGS

FIG. 3 shows an example of pairing information to be obtained from information communication devices.

FIG. 4 shows an example that includes pairing information and information on a discovery protocol.

DESCRIPTION OF THE EMBODIMENTS

Exemplary embodiments according to the present invention will now be described in detail with reference to the drawings. The discovery protocol and pairing information will be described before the exemplary embodiments according to the present invention.

The discovery protocol is a technique for enabling network devices to use other network devices connected to the same LAN. The discovery protocol is implemented in various forms, for example, UPnP, Rendezvous, WS-Discovery, and SLP (Request for Comments (RFC): 2165).

Information communication devices that support the discovery protocol have a sending process of sending information on the existence of each information communication device to other network devices on a network and a receiving process of obtaining information on the existence of other network devices. Moreover, these information communication devices have a function of obtaining as necessary detailed information on other network devices the existence of which is recognized by the information communication devices.

An information element that is referred to as pairing information used in the exemplary embodiments will now be described. Pairing information is information on connection targets required for communication in wireless communication networks to determine connection targets and that is obtained in advance via, for example, wire communication or a medium such as a universal serial bus (USB) memory, a flash memory, a CompactFlash (CF) card, or a Secure Digital (SD) card.

For example, this information element can be defined as shown in FIG. 3. The main purpose in using this information element is to simplify complicated settings for participating in a wireless communication network, and information related to a wireless LAN, such as an extended service set identifier (ESSID) and a basic service set identifier (BSSID), is required.

In the exemplary embodiments, the following information is held as information required for wireless communication in compliance with the Institute of Electrical and Electronics Engineers (IEEE) 802.11, as shown in FIG. 3: network identifiers such as an ESSID and a BSSID, a network connection mode such as an infrastructure mode or an ad-hoc mode, a frequency channel in use, ciphering information, and authentication information. Moreover, a universally unique identifier (UUID) unique to a device is held as information for determining the device.

That is to say, a device can readily select and connect to another device to which the device needs to connect from a plurality of devices on a wireless communication network without complicated connection settings by setting pairing information on devices in advance.

First Exemplary Embodiment

Control that executes a discovery protocol from any network device (information communication device) to generate a list of network devices on a network so that a user can select connection targets will now be described as a first exemplary embodiment.

Figure 1:
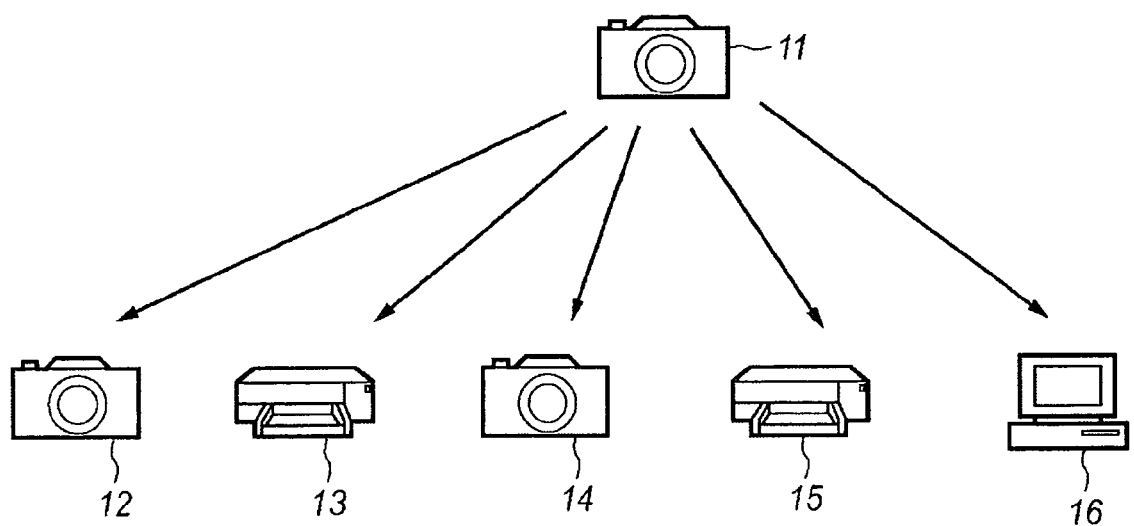
FIG. 1 shows the configuration of an exemplary wireless communication system that includes a wireless communication interface having a discovery function.

FIG. 1 shows the configuration of an exemplary wireless communication system that includes a wireless communication interface that has a discovery function. A wireless communication network according to the first exemplary embodiment includes three cameras 11, 12, and 14, two printers 13 and 15, and a personal computer (PC) 16 at least, as shown in FIG. 1.

In the wireless communication system shown in FIG. 1, the camera 12, the printer 13, and the PC 16 are information communication devices that have a function of executing a discovery protocol referred to as UPnP, the printer 15 is an information communication device that has a function of executing a discovery protocol referred to as Rendezvous, and the cameras 11 and 14 are information communication devices that have a function of executing both UPnP and Rendezvous protocols.

Figure 7:
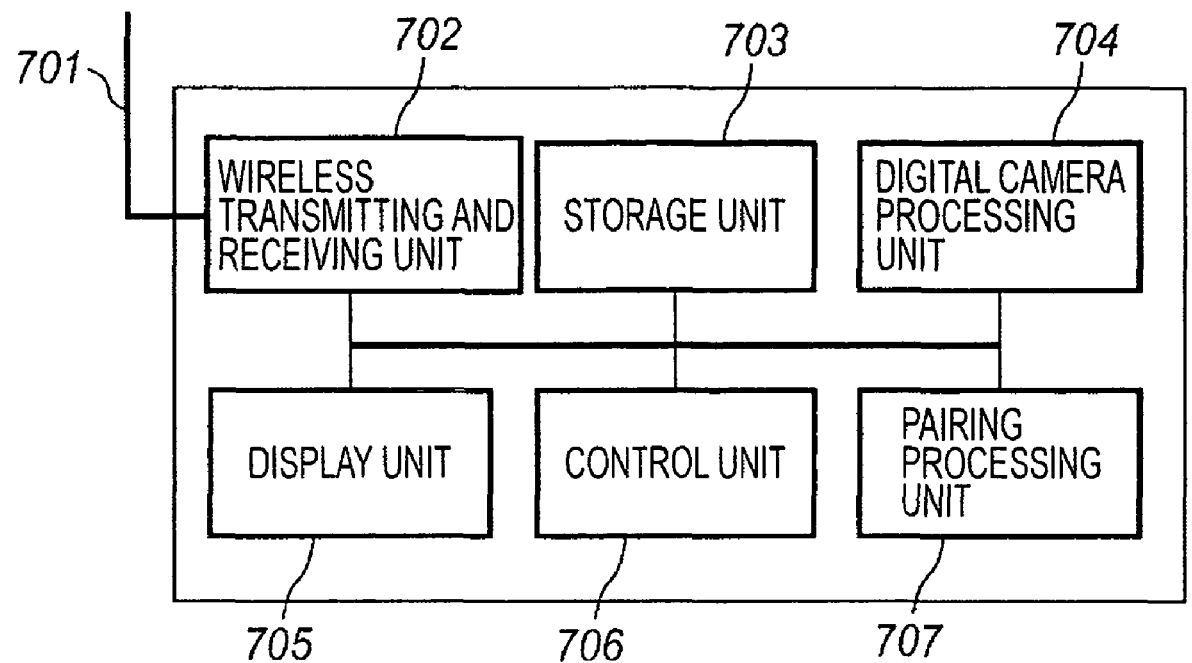
FIG. 7 is a schematic block diagram showing an example of the structure of a camera according to the first and second exemplary embodiments.

FIG. 7 is a schematic block diagram showing an example of the structure of the camera 11 according to the first exemplary embodiment. The camera 11 includes an antenna 701, a wireless transmitting and receiving unit 702, a storage unit 703, a digital camera processing unit 704, a display unit 705, a control unit 706, and a pairing processing unit 707. The antenna 701 transmits and receives radio waves. The wireless transmitting and receiving unit 702 modulates digital signals to be transmitted for wireless transmission, converts the modulated transmission data into data in a format that can be transmitted through the air, and transfers the converted data to the antenna 701. The wireless transmitting and receiving unit 702 also retrieves modulated data from data received through the air from the antenna 701, demodulates the received signals, and converts the demodulated signals into digital signals. The storage unit 703 stores, for example, video signals captured by the digital camera processing unit 704 and setting information. The digital camera processing unit 704 includes an imaging unit that optically captures an image of a subject with charge-coupled devices (CCDs), converts the captured image into electrical signals, and outputs the electrical signals. The digital camera processing unit 704 performs predetermined processing on video signals output from its imaging unit. The display unit 705 displays, for example, the state of the camera 11 and various types of setting screens. The control unit 706 includes a central processing unit (CPU) that provides overall control of a digital camera according to a program described below, a read only memory (ROM) that stores the program and control data of the CPU, and a random access memory (RAM) that includes, for example, a work area and various types of tables that are used by the CPU to perform processing. The details of the pairing processing unit 707 are described below.

The structures of the cameras 12 and 14 are the same as that of the camera 11. The structures of the printers 13 and 15 are the same as that of the camera 11 except that the digital camera processing unit 704 is replaced with a print processing unit.

A process will now be described, which displays a list of information communication devices on a network so that the owner of the camera 11 according to the first exemplary embodiment can readily select a printer that the owner needs to use when the owner needs to print a captured picture with the printer.

Figure 2:
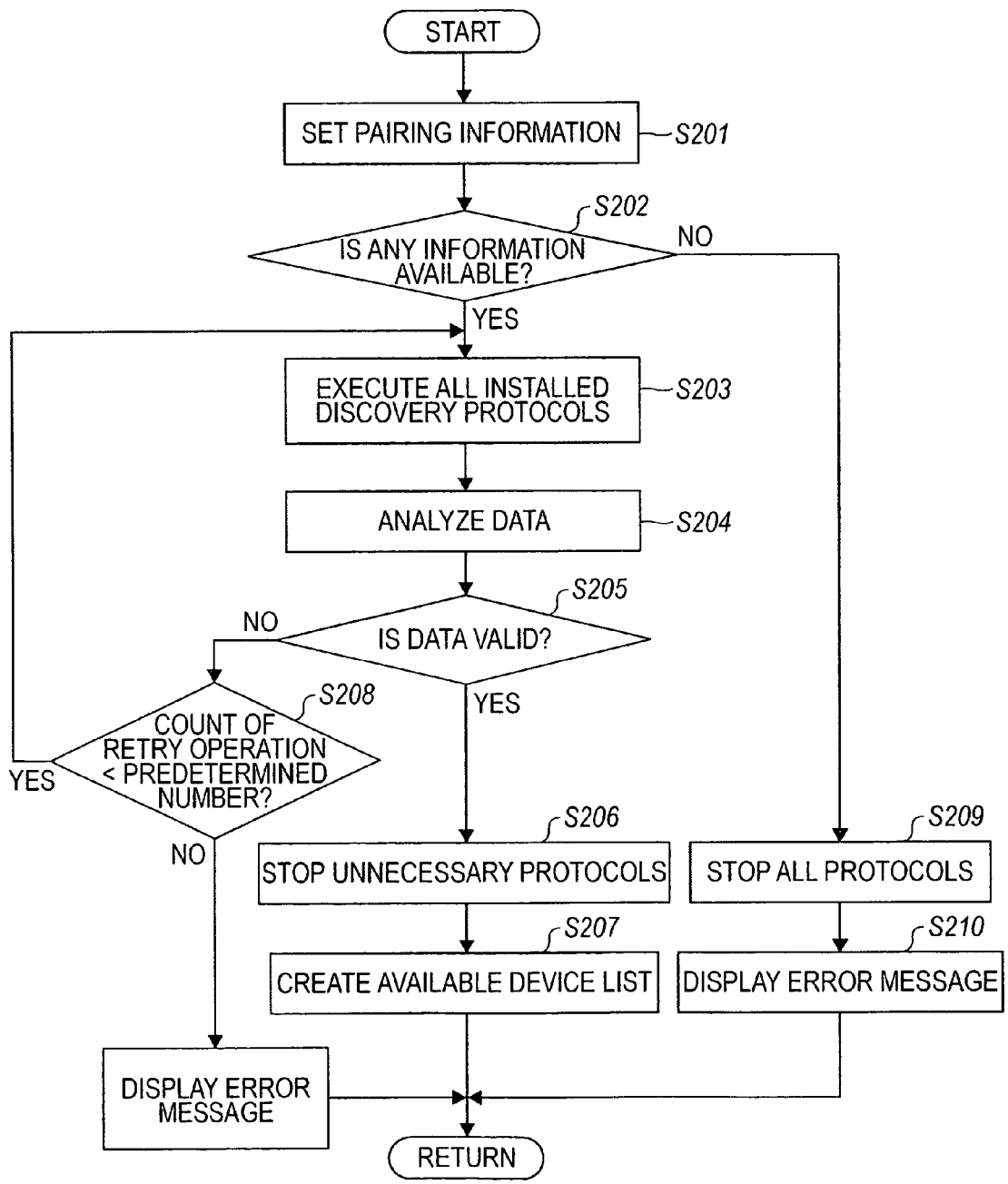
FIG. 2 is a flowchart showing a process of obtaining information for selecting devices to be used in a first exemplary embodiment.

FIG. 2 is a flowchart showing a process of obtaining information for selecting devices to be used in the first exemplary embodiment. This process is performed by the control unit 706 of the camera 11.

First the pairing processing unit 707 sequentially connects the camera 11 to the other information communication devices through appropriate media (for example, a wired LAN or a USB) under the control of the control unit 706 to obtain the pairing information shown in FIG. 3 from the individual information communication devices. Then, in step S201, the pairing processing unit 707 stores the pairing information, to which information of discovery protocols of the other information communication devices is added, in a format shown in FIG. 4. In this step, information other than the pairing information has not been stored in the camera 11. The pairing information is used to determine connection targets (devices subjected to pairing) in the camera 11 and the wireless network, as described above. In this case, information, such as an ESSID and/or a BSSID serving as network identifiers, ciphering information, authentication information, and a UUID that is unique to each device, is obtained, and specific information is stored in field DETAILS. When a plurality of devices subjected to pairing exist, a plurality of pieces of the information shown in FIG. 4 are stored for the individual devices subjected to pairing. A discovery protocol (UPnP or Rendezvous) to be used is stored in field DETAILS as discovery information shown in FIG. 4. User selection information shown in FIG. 4 indicates whether the user has selected the corresponding device in advance, and the user can perform selection at any time by operating an operation unit after the pairing information is stored.

Then, in step S202, the control unit 706 determines whether any information in the format shown in FIG. 4 is set (stored) in the camera 11 to connect the camera 11 to other information communication devices (in this case, the printers). When the control unit 706 determines that no information is set in the camera 11, all discovery protocols are stopped in step S209, an error status is displayed on the display unit 705 in step S210, and the process is completed. An exemplary error message states that no information communication device exists as a connection target or that no connection target is currently specified.

However, even in a case where the control unit 706 determines that some information is set in the camera 11, when specific information, such as connection addresses, protocols, and the like of the other information communication devices, is not available, the camera 11 cannot directly communicate with intended devices although the camera 11 can connect to the wireless communication network.

Thus, in step S203, all discovery protocols available to the camera 11 are executed to submit inquiries to all information communication devices that exist on the network and to obtain responses.

Then, response data obtained from the individual information communication devices by executing discovery protocols are analyzed in step S204, and it is determined in step S205 whether the response data is valid. When it is determined in step S205 that the response data is invalid or that the information communication devices registered in the pairing information are not detected in the response data, discovery protocols are executed again because the condition of radio propagation may have affected the result.

This retry operation is performed a predetermined number of times. When it is determined in step S208 that no corresponding information communication device is detected after the retry operation has been performed the predetermined number of times, it is determined that information communication devices described in the pairing information do not exist in wireless communication range. When it is determined that the information communication devices described in the pairing information do not exist, an error message stating that no target information communication device exists is displayed on the display unit 705.

In this case, it is meaningless for the camera 11 to execute a message sending process of each discovery protocol, i.e., a process of sending inquiry messages, network-participation-notification messages, and the like of each discovery protocol. Thus, sending processes of all discovery protocols can be stopped.

However, a message receiving process of each discovery protocol, i.e., a process of receiving, for example, network-participation-notification messages is continued in view of a case where information communication devices described in the pairing information participate in the network.

Thus, when information communication devices described in the pairing information participate in the same network, the camera 11 can receive network-participation-notification messages sent by the information communication devices and detect that the information communication devices participate in the network. In this case, message sending processes of discovery protocols that use the received messages are activated.

In a case where information communication devices described in the pairing information participate in the network, when sending processes of discovery protocols used by the information communication devices are stopped, these processes are activated. In a case where other information communication devices that are not described in the pairing information participate in the network, when sending processes of discovery protocols used by the information communication devices are stopped, these processes are not activated.

When it is determined in step S205 that the response data is valid, as a result of analysis of the response data in step S204, unnecessary discovery protocols are stopped with reference to the response data and the pairing information in step S206. This operation will now be described in detail with reference to FIG. 6.

Figure 6:
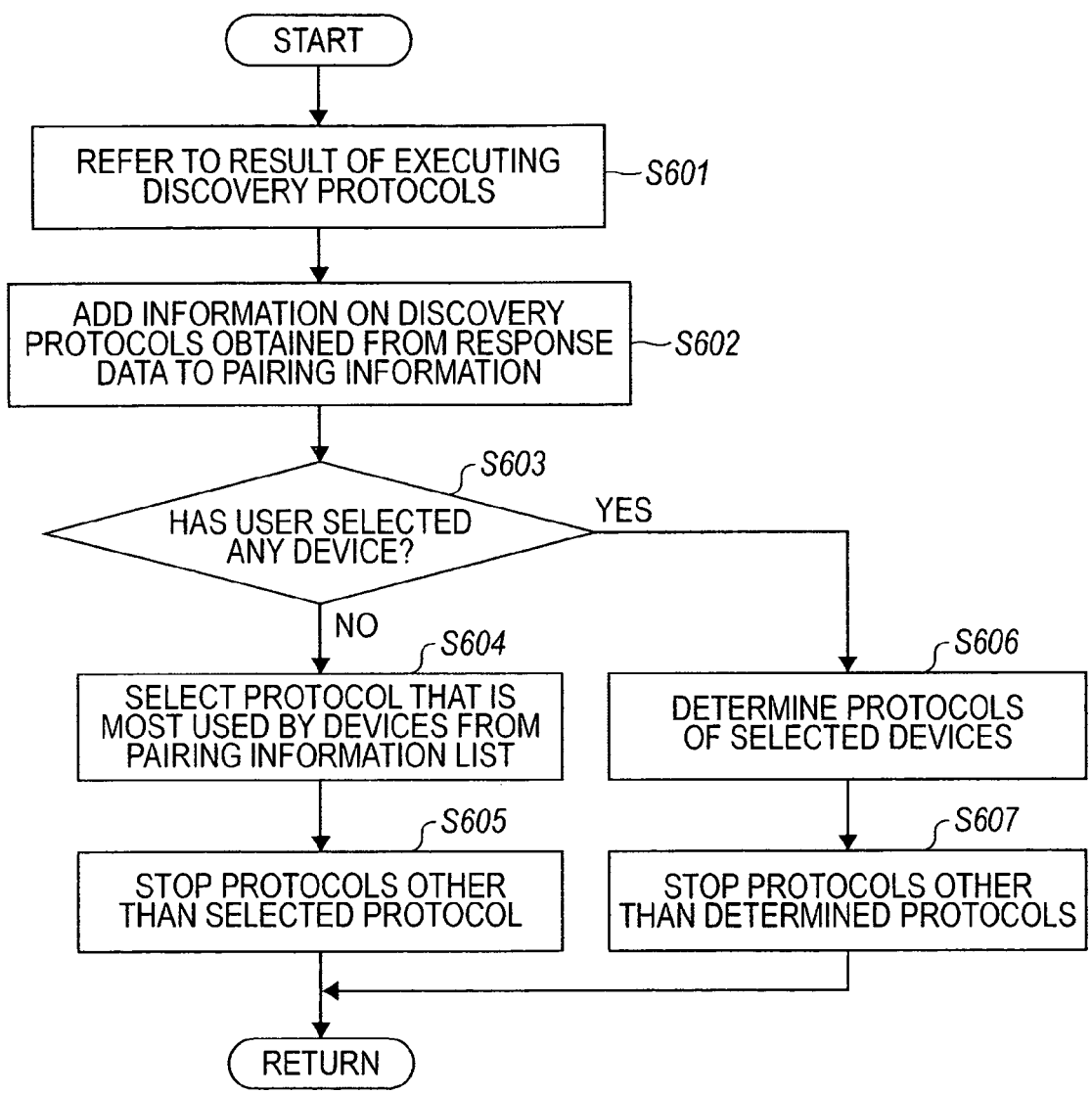
FIG. 6 is a flowchart showing a process of stopping unnecessary discovery protocols.

FIG. 6 is a flowchart showing a process of stopping unnecessary discovery protocols. The result of executing discovery protocols is referred to in step S601, and information of discovery protocols corresponding to response data from devices the pairing information of which is registered is stored in the storage area of the camera 11 as discovery information in the format shown in FIG. 4 in step S602. For example, when response data in the UPnP format is received, "UPnP" is stored in field DETAILS, and when response data in the Rendezvous format is received, "Rendezvous" is stored in field DETAILS. Then, in step S603, it is determined whether any information communication device has been selected for use by the user operation in advance on the basis of user selection information shown in FIG. 4.

When it is determined in step S603 that the user has selected any of the information communication devices, discovery protocols used by the information communication devices are selected from discovery information shown in FIG. 4 in step S606. Then, in step S607, processes of discovery protocols other than the selected discovery protocols are stopped.

On the other hand, when it is determined in step S603 that the user has not selected any information communication device, a discovery protocol that is most used by relevant devices or, alternatively, that is owned by the largest number of communication devices is selected from the list of pairing information (shown in FIG. 4) in the storage area in step S604. Then, in step S605, processes of all discovery protocols other than the discovery protocol selected in step S604 are stopped.

In the first exemplary embodiment, the number of information communication devices that use UPnP as the discovery protocol is largest, i.e., the cameras 12 and 14, the printer 13, and the PC 16 use UPnP. Thus, UPnP is selected as the discovery protocol, and all processes of Rendezvous protocol are stopped.

The load of the communication processing in the camera 11 is reduced due to the aforementioned processing in step S206 (i.e., step S605 or S607 in FIG. 6). Thus, the traffic of unnecessary radio signals can be reduced. Moreover, the power consumption can be reduced, and resources saved by reducing the load of the communication processing can be assigned to other processing, for example, in the case of a digital camera, image processing or image display processing.

However, in view of a case where new information communication devices that are described in the aforementioned pairing information and currently not detected participate in the network, a message receiving process of Rendezvous is activated.

When the process of stopping unnecessary discovery protocols is completed, the process returns to the steps in FIG. 2. Then, in step S207, a list is created and displayed. The list includes the pairing information and information on information communication devices from which response data has been obtained by discovery protocols. These information communication devices are regarded as those that can be used by the user. In step S207, the following patterns of the list are supposed. That is to say, when it is determined in step S603 in FIG. 6 that the user has selected any of the information communication devices and when response data has been received from these information communication devices, information on the selected information communication devices and information stating that the user has selected these information communication devices in advance are displayed. Alternatively, when it is determined in step S603 in FIG. 6 that the user has selected any of the information communication devices and when no response data has been received from these information communication devices, information on other information communication devices from which response data has been received and information stating that no response data has been received from the selected information communication devices are displayed. Alternatively, when it is determined in step S603 that the user has not selected any information communication device, information on other information communication devices from which response data has been received and information stating that the user has not selected any information communication device are displayed. Alternatively, when the user has selected any of the information communication devices, information on information communication devices from which response data has been received by discovery protocols used by the selected information communication devices may be displayed. Alternatively, when a discovery protocol has been selected in step S604 in FIG. 6, information on information communication devices from which response data has been received through the selected discovery protocol may be displayed.

The list of available devices created in the aforementioned process includes only necessary devices selected from among devices from which response data has been obtained by discovery protocols, as described above. Thus, the user operability is improved.

Even after discovery protocols for which a message sending process is performed are limited, a message receiving process is activated for all protocols. Thus, when new information communication devices described in the pairing information participate in the network, participation messages from discovery protocols sent by these information communication devices can be received. Accordingly, the existence of these information communication devices can be recognized.

However, the sending process is stopped for discovery protocols used by some information communication devices. Thus, when the discovery protocols used by these information communication devices are different from that used by the camera 11, these information communication devices cannot be used.

In the case where sending processes of discovery protocols other than a discovery protocol that is most used by devices are stopped in step S605, a discovery protocol that is most used by devices in the network may be different from that being currently used when new information communication devices participate in the network. In this case, only when no device is communicating with the camera 11 or is being used by the camera 11, the discovery protocol in use may be automatically changed.

Second Exemplary Embodiment

A second exemplary embodiment according to the present invention will now be described in detail with reference to the drawings. In the second exemplary embodiment, control of sending and receiving processes of a discovery protocol of an information communication device will be described.

The structure of a system according to the second exemplary embodiment is the same as that according to the first exemplary embodiment shown in FIG. 1. The structure of the camera 11 according to the second exemplary embodiment is the same as that shown in FIG. 7.

Figure 5:
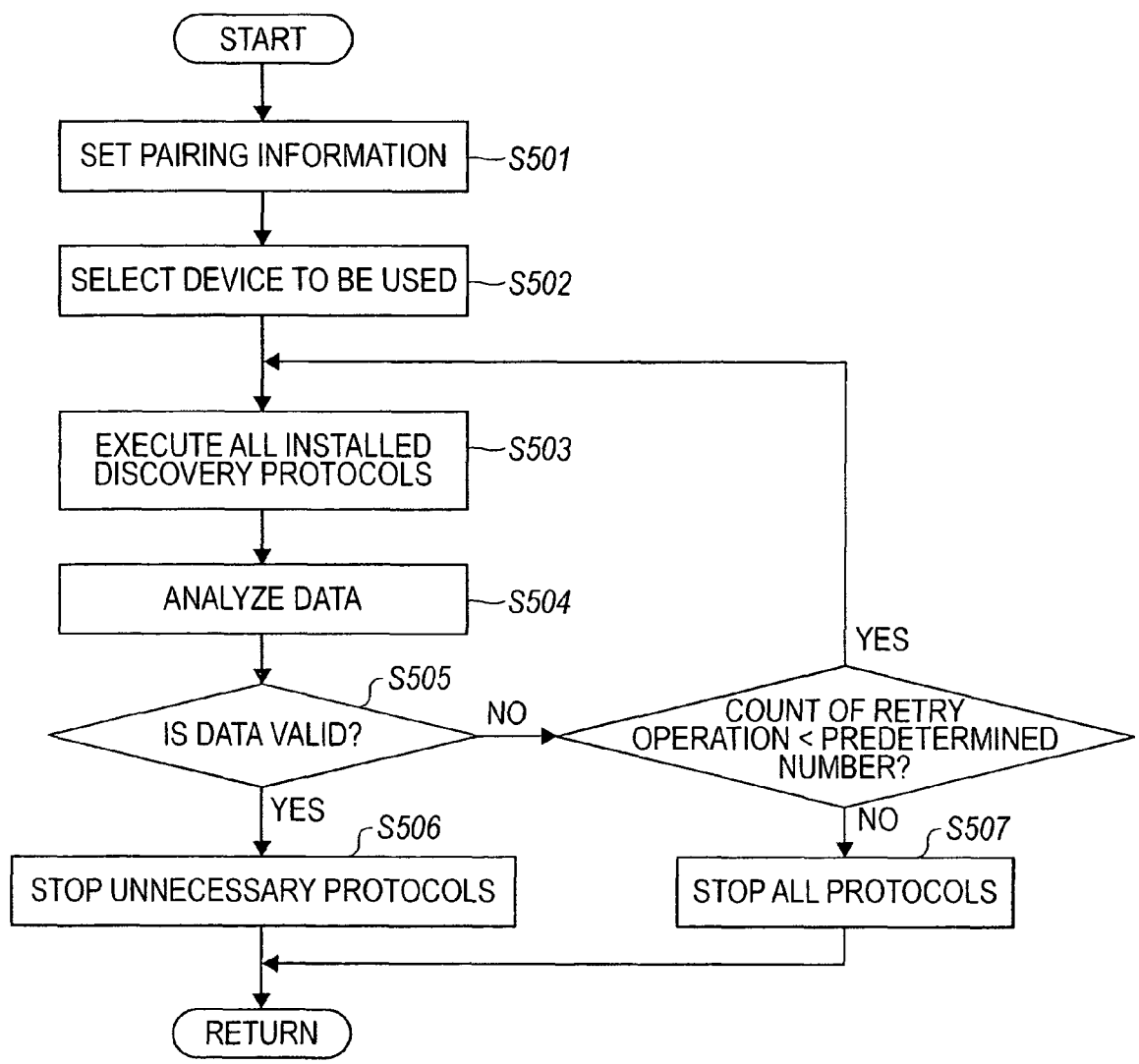
FIG. 5 is a flowchart showing a process of obtaining information for selecting a device to be used in a second exemplary embodiment.

FIG. 5 is a flowchart showing a process of obtaining information for selecting a device to be used in the second exemplary embodiment. This process is performed by the control unit 706 of the camera 11.

In step S501, information on a plurality of information communication devices to which the camera 11 needs to connect is first stored in the camera 11 as the pairing information, as in the first exemplary embodiment. Then, in step S502, one information communication device that the user needs to use is selected in advance from the pairing information set for the information communication devices. In the second exemplary embodiment, it is assumed that the camera 14 is selected.

In step S503, all discovery protocols supported by the camera 11 are executed to obtain information on information communication devices that are participating in the same network. Then, response data received from the individual information communication devices in response to inquiries of discovery protocols is analyzed in step S504, and availability of information on the information communication device selected in step S502, which the user needs to use, is checked in step S505.

When the information on the selected information communication device (in the second exemplary embodiment, the camera 14) exists in the response data received in response to inquiries of discovery protocols, both sending and receiving processes of protocols other than discovery protocols that have sent the response data are stopped in step S506.

This process is the same as that in the first exemplary embodiment described with reference to FIG. 6 except that a sending process is stopped in the first exemplary embodiment and both sending and receiving processes are stopped in the second exemplary embodiment.

When the information on the selected information communication device cannot be obtained, retry operation is performed a predetermined number of times. When the retry operation fails, it is determined that the selected information communication device does not exist on the network due to a reason that, for example, the selected information communication device is turned off, all of the discovery protocols supported by the camera 11 are stopped in step S507.

Unnecessary processing can be reduced by the aforementioned operation. Thus, the power consumption of a power-saving device such as a built-in device can be reduced, and long-time operation is enabled. The user starts communication by performing the operation again after checking the settings of a device that the user needs to use.

Although wireless communication was described in the above exemplary embodiments, the present invention can also be applied to wire communication in the same manner.

Moreover, although a wireless LAN was described as an example of wireless communication, the present invention is not limited to the above exemplary embodiments and can also be applied to other wireless communication methods, for example, Bluetooth, WirelessUSB, and Wireless1394.

In the exemplary embodiments, even in a network environment in which information communication devices that have a plurality of different individual discovery protocols exist, an information communication device can obtain information on other information communication devices on the network by having a plurality of discovery protocols. In particular, an information communication device stores pairing information on other information communication devices on a network in advance. Thus, the information communication device can perform a filtering operation to select only devices that the user really needs on the basis of discovery responses that can be obtained, and the user operability can be improved.

In the prior art, it cannot be determined until the user selects devices to be used whether target devices that are communication partners exist. In contrast, in the present invention, it can be determined by using the pairing information before the user selects devices whether target devices exist. Thus, when target devices do not exist, a message stating that the target devices do not exist can be promptly sent to the user. Moreover, when target devices exist, the target devices can be limited so that the user can readily select devices regardless of the number of the target devices.

Moreover, since limited protocols to be used are activated on the basis of the pairing information, unnecessary processing can be reduced. Consequently, a device can be operated in a power-saving mode or the CPU resources of the device can be assigned to other processing. Thus, the overall performance of a system can be improved. Moreover, at least one protocol is selected from a plurality of protocols for obtaining information on connection targets on the basis of the pairing information, and a list of information communication devices that have the at least one protocol is created. Thus, the user can readily select target information communication devices, and user convenience can be improved. Moreover, unnecessary traffic can be reduced by stopping processes of protocols other than the at least one protocol, which is selected, and the throughput of a device can be improved.

The present invention can be applied to a system that includes a plurality of devices (for example, a host computer, an interface device, a reader, and a printer) and an apparatus (for example, a copying machine or a facsimile machine) that includes a device.

Needless to say, the exemplary embodiments are also implemented by providing a system or an apparatus with a storage medium that stores program codes of software that perform the functions according to the foregoing exemplary embodiments and by causing a computer (a CPU or a micro processing unit (MPU)) included in the system or in the apparatus to read and execute the program codes stored in the storage medium.

In this case, the program codes read from the storage medium can perform the functions according to the foregoing exemplary embodiments, and thus the present invention includes the storage medium that stores the program codes.

A typical storage medium for supplying the program codes is a floppy disk, a hard disk, an optical disk, a magneto-optical (MO) disk, a compact disk—read only memory (CD-ROM), a compact disk—recordable (CD-R), a magnetic tape, a non-volatile memory card, or a ROM.

Moreover, an operating system (OS) operating on a computer may execute some or all of the actual processing to perform the functions of the foregoing exemplary embodiments according to instructions from the program codes.

Moreover, the program codes read from the storage medium may be written to a memory included in, for example, a function expansion board inserted in a computer or a function expansion unit connected to a computer. Then, for example, a CPU included in the function expansion board, the function expansion unit, or the like may execute some or all of the actual processing to perform the functions of the foregoing exemplary embodiments according to instructions from the program codes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-112665 filed Apr. 8, 2005, which is hereby incorporated by reference herein in its entirety.

What is claimed is:

1. A communication device comprising:
    a discovery unit that discovers other communication devices on a network, wherein the discovery unit performs a plurality of discovery protocols of a plurality of types;
    a managing unit that manages the other communication devices by relating identifiers of the other communication devices to a discovery protocol type used by each of the other communication devices, according to a result of the discovery operation performed by the discovery unit using the plurality of discovery protocols;
    a determination unit that determines a target communication device which has been selected by a user among the other communication devices managed by the managing unit; and
    a selecting unit that selects a discovery protocol type used by the target communication device which is determined as the target communication device by the determination unit,
    wherein, during performing the plurality of discovery protocols, the discovery unit stops a sending process for sending an inquiry message by a discovery protocol type other than the discovery protocol type selected by the selecting unit and does not stop a receiving process for receiving a network-participation-notification message by the discovery protocol type other than the discovery protocol type selected by the selecting unit, and the discovery unit does not stop a sending process for sending an inquiry message by the discovery protocol type selected by the selecting unit and does not stop a receiving process for receiving a network-participation-notification message by the discovery protocol type selected by the selecting unit.

2. The communication device according to claim 1, further comprising a display unit that displays a list of communication devices discovered using the discovery protocol selected by the selecting unit.

3. The communication device according to claim 2, wherein the display unit displays information indicating that no response has been received from the selected target communication device, and information of other communication devices from which a response has been received.

4. The communication device according to claim 1, wherein the communication device does not perform the sending process of all the discovery protocols of the discovery unit, in a case where the other communication devices are not managed by the managing unit.

5. The communication device according to claim 1, wherein the managing unit manages information to wirelessly communicate with the other communication devices.

6. The communication device according to claim 1, wherein the managing unit manages any one of at least a network identifier, ciphering information, and authentication information.

7. The communication device according to claim 1, wherein the selecting unit selects a discovery protocol used by the discovery unit, according to the discovery protocols used by the other communication devices managed by the managing unit, if the determination unit does not determine the target communication device.

8. A method for controlling a communication device that discovers other communication devices on a network by a plurality of discovery protocols of a plurality of types, the method comprising the steps of:
- discovering with a discovery unit other communication devices on a network using a plurality of discovery protocols;
- managing the other communication devices by relating identifiers of the other communication devices to a discovery protocol type used by each of the other communication devices, according to a result of the discovering step using the plurality of discovery protocols;
- determining a target communication device that has been selected by a user among the other communication devices managed in the managing step; and
- selecting a discovery protocol type used by the target communication device that is determined as the target communication device by the determining step, wherein, during performing the plurality of discovery protocols, the discovery unit stops a sending process for sending an inquiry message by a discovery protocol type other than the discovery protocol type selected in the selecting step and does not stop a receiving process for receiving a network-participation-notification message by the discovery protocol type other than the discovery protocol type selected in the selecting step, and the discovery unit does not stop a sending process for sending an inquiry message by the discovery protocol type selected in the selecting step and does not stop a receiving process for receiving a network-participation-notification message by the discovery protocol type selected in the selecting step.

9. A computer-readable code embedded in a non-transitory computer-readable storage medium for causing a computer to execute the steps according to claim 8.

* * * * *